United States Patent [19]

Barth et al.

[11] 3,859,168

[45] Jan. 7, 1975

[54] PROCESS OF INACTIVATING RABIES VIRUS

[75] Inventors: Rudolph Barth; Oskar Jaeger, both of Marburg/Lahn, Germany

[73] Assignee: Behringwerke Aktiengesellschaft, Marburg/Lahn, Germany

[22] Filed: May 22, 1973

[21] Appl. No.: 362,820

Related U.S. Application Data

[63] Continuation-in-part of Ser. No. 56,224, July 15, 1970, abandoned, which is a continuation of Ser. No. 737,865, June 18, 1968, abandoned.

[30] Foreign Application Priority Data

June 22, 1967 Germany............................ 1617350

[52] U.S. Cl..................................... 195/1.2, 424/89
[51] Int. Cl. ........................ C12k 7/00, A61k 23/00
[58] Field of Search......................... 195/1.2; 424/89

[56] References Cited
UNITED STATES PATENTS 3,322,632   5/1967   Schwick et al....................... 424/89

FOREIGN PATENTS OR APPLICATIONS 1,588,829   4/1970   France................................ 195/1.2

*Primary Examiner*—Sam Rosen
*Attorney, Agent, or Firm*—Curtis, Morris & Safford

[57] ABSTRACT

Process for inactivating a pathogenic rabies virus to produce an apathogenic antigen adaptable to use in the manufacture of a killed vaccine which process comprises freeze drying said rabies virus in the presence of a modified gelatin hydrolyzate containing cross linking urea-alkyleneurea groups and having a molecular weight from about 15,000 to 60,000 and then heating the freeze dried material at a temperature from 30°C to 110°C for 15 minutes to 12 weeks until the pathogenicity thereof is completely destroyed.

3 Claims, No Drawings

PROCESS OF INACTIVATING RABIES VIRUS

This application is a continuation-in-part of our application Ser. No. 56,224 filed July 15, 1970 which was a continuation of our application Ser. No. 737,865 filed June 18, 1968, both now abandoned.

The present invention relates to a process for inactivating a pathogenic rabies virus.

Processes are already known for the inactivation of biological substances, in particular of infectious microorganisms and/or their antigens. For this purpose, either chemical or physical methods have been hitherto used. These known processes all have in common an inactivation of the biological substances in the liquid state. The chemical methods have the disadvantage that for combining the biological material with the inactivating substance, the former must be opened and may be contaminated by fungi and bacteria. In most cases, added chemicals do not permit exact discontinuation of the inactivation and affect desired properties, for example the antigenicity of virus and bacteria intended to be used for the manufacture of vaccines. The storability of such substances is limited for the same reason. However, the storability of biological material is an important factor, for example during transportation or in tropical countries where higher temperatures are unavoidable and must be taken into account. Therefore, storage in a refrigerator is prescribed for such preparations. The attempt has also been made, when formaldehyde is used as the inactivating agent, to add bisulfite for binding the unreacted formaldehyde; but this again required opening of the biological material. Another disadvantage has also been the fact that the chemicals added, for example phenol, cause intolerance reactions in humans and animals.

The physical methods, too, have disadvantages. Thus, for example, for inactivating suspensions which contain the mentioned biological substances, these suspensions must be subjected in a uniformly thick film to ultraviolet irradiation in a special apparatus. This may cause, under certain circumstances, formation of peroxides which may continue the inactivation for an undesirably long period of time.

The object of the present invention is a process for inactivating a pathogenic rabies virus which process comprises freeze drying said rabies virus in the presence of a modified gelatin hydrolyzate containing cross linking urea-alkylene-urea groups and having a molecular weight from about 15,000 to 60,000 and then heating the freeze dried material at a temperature from 30°C to 110°C for 15 minutes to 12 weeks until the pathogenicity thereof is completely destroyed.

A further object of the present invention is the inactivated rabies virus prepared according to the above process and serving for the manufacture of vaccines.

The process of the present invention is novel, since no method has hitherto been known which would permit the inactivation of biological material such as infectious microorganisms and/or their antigens in dry form by the action of heat. As has already been pointed out above, inactivation according to known methods has always been carried out in the liquid phase, either with the aid of suitable chemical agents or physically, for example by means of ultraviolet irradiation. Inactivation of biological material by the action of heat has generally been considered with a prejudice because earlier tests had shown that inactivation in the liquid phase generally caused denaturation of the material and therewith impairment of desired biological properties, or even caused destruction of these properties.

Thus, it was surprising that inactivation according to the present invention by the action of heat on dry biological material does not cause its denaturation.

Whereas chemical substances, for example phenol, formaldehyde, etc., are used as inactivating agents in the known methods of inactivation, no such chemical agents are added in the process of the present invention, so that side effects such as intolerance reactions, which are due to the presence of the inactivation agents, do not occur when the preparations are administered medicinally. Furthermore, the method of the present invention has the advantage that no risk of bacterial contamination of the biological material during the inactivation process is incurred, since the inactivation can be carried out in a closed vessel. In order to discontinue the inactivation, it is only necessary to cool the material to a lower temperature, for example to room temperature. Another technical advantage is that the preparations prepared according to the present invention have a stronger activity than the known preparations and that they may be exposed to such temperatures at which the vaccines of the state of the art are already inactivated.

For preparing a vaccine from the inactivated rabies virus prepared according to the present invention, the dry preparation is simply combined with distilled water, up to the desired concentration, if desired with the addition of a suitable buffer, for example a phosphate solution which may also contain an adjuvant, for example aluminum hydroxide. The vaccine thus obtained permits the production in known manner of immunities against rabies.

Furthermore, the vaccines prepared according to the present invention have the advantage over the vaccines obtained by known methods that they are considerably more stable. While the vaccines prepared according to known methods — because of their sensitivity to higher temperatures — have to be stored and transported at temperatures in proximity of the freezing point (0° -4°C), which, for example under tropical conditions, is connected with difficulties, the vaccines prepared according to the process of the present invention are well storable also at elevated temperatures, for example at 60°C, even over prolonged periods of time.

The process of the present invention is suitably carried out by combining a conventionally prepared aqueous suspension of rabies virus having antigenic action, with a stabilizing substance as defined below, then freeze-drying it and heating the dry preparation obtained for a period from 15 minutes up to 12 weeks, preferably for a period from 60 minutes to 10 weeks, to a temperature from 30° to 110°C, preferably to 35°–100°C.

As a stabilizer, a polymerisation product prepared according to German Pat. No. 1,118,792 from degraded gelatin, which is commercially available under the Registered Trade mark Haemaccel is used.

The duration of the action of heat is in inverse proportion to the temperature at which the inactivation according to the invention is carried out, i.e., the higher the inactivation temperature, the shorter the time required for complete inactivation. For example, the inactivation of rabies viruses in the presence of Haemaccel as the stabilizer at 37°C takes 60 days, whereas at 56°C it requires only 7 days.

After treatment according to the present invention, the preparations are subjected to the usual tests in order to determine whether the pathogenicity is removed and whether the antigenicity is maintained. Thus, innocuousness is tested by intracerebral injection into mice and antigenic activity is determined by the Habel test (WHO Monograph Series No. 23,140 (1966).

The following Examples illustrate the invention but they are not intended to limit it thereto:

EXAMPLE:

20 g of wet substance recovered from the brain and the spinal cord of a rabbit infected with fixed rabies virus were combined with 180 ml of a 3.5 percent solution of a polymeric gelatin derivative, commercially available under the Registered Trade mark Haemaccel. The mixture was blended in a homogenizer to a fine suspension, filled into flasks having a capacity of 7 ml and freeze-dried.

The virus concentration of the dried material, which had been reconstituted to 7 ml was checked in mice having a weight in the range of 11 – 15 g by intracerebral (i.c.) titration. It was found to be $10^{4.0} LD_{50}$ per 0.03 ml.

For inactivation of the virus material, the flasks were then heated for 7 days to 56°C. Macroscopically, the action of heat did not change the dry material. After 7 days the material was diluted with distilled water to the original concentration (7 ml) and the innocuousness and the activity were tested in mice having a weight ranging from 11 – 15 g in the following manner:

Test for innocuousness in a. Mice:

Twenty Mice received 0.03 ml of the dissolved material by intracerebral injection. Within an observation period of 14 days, the animals showed no signs of rabies. The virus material was thus inactivated. The result was confirmed by several tests.

b. Dogs:

Two Dogs received subcutaneously, on 6 consecutive days, 4 ml of the vaccine prepared according to the present invention. During an observation period of 21 days, neither local nor general reactions were observed.

c. Guinea pigs:

Five Guinea pigs were administered intraperitoneally 2 ml each of the vaccine prepared according to the present invention. During an observation period of 10 days, neither local nor general reactions were observed.

Six Guinea pigs were administered subcutaneously 0.5 ml each of the vaccine to be tested. During an observation period of 10 days, no local reactions were observed.

d. Rabbits:

Five rabbits were administered intracerebrally 0.3 ml each of the vaccine prepared according to the present invention.

During the observation period of 42 days, no reactions were observed. The result was confirmed by repeated tests carried out under the same conditions and with the same number of animals.

The above-described innocuousness tests showed that the rabies vaccine prepared according to the present invention is innocuous and well tolerated.

Activity:

a. Mouse

The activity of the rabies vaccine was determined according to the so-called Habel test. To carry out this test, 60 mice were immunized by 6 intraperitoneal (i.p.) injections of 0.25 ml each of a suspension, which was obtained by diluting to a ratio of 1 : 20 the content of a flask (7 ml) with phosphate-buffered distilled water or physiological NaCl solution, and which thus contained the brain and spinal cord material in a concentration of 0.5 percent. The injections were given each time on Monday, Wednesday and Friday of two consecutive weeks. 15 Days after the first vaccination, the mice were subjected to a challenge infection. For this purpose, 10 mice each were infected, intracerebrally (i.c.), with 0.03 ml of the virulent rabies test virus CVS 27 I b 2 (Challenge virus strain) in dilutions from $10^{-1}$ up to $10^{-6}$. At the same time, 10 untreated mice were infected with dilutions from $10^{-5}$ to $10^{-7}$.

The 50 percent end points of both test series were then determined according to Reed and Münch [cf. Am. J. Hyg. 27, 493 (1938)]. The difference between both final points is the $PD_{50}$, i.e. the dose which is capable of protecting 50 percent of the animals against an infection of the indicated magnitude. A vaccine is considered as having passed the Habel test if the difference between both 50 percent end points of the vaccinated group and of the control group, i.e., the $PD_{50}$, reaches a value higher than $10^{3.0}$ or more. The vaccine prepared according to the present invention gave in several tests a titer of $10^{4.0}$ to $10^{4.5}$ $PD_{50}$ per 0.03 ml.

b. Dog

The vaccine prepared according to the present invention (A 12) was administered subcutaneously, in doses of 1 × 10 ml and 1 × 5 ml, to groups of 2 dogs each, the sera of which, at the beginning of the test, were free from virus-neutralizing antibodies against rabies. The course of the immunity was controlled over a period of 52 weeks by examination of the mixed sere of the groups of dogs by periodical withdrawal of blood and determination of the antibodies by serum neutralization tests in a white mouse. 14 Days after the immunization, the maximum of immunity was already reached with titers between 1 : 12 and 1 : 150 (50 percent neutralizing end point of the serum dilution, i.e. this dilution neutralizes 50 percent of a same volume of a virus suspension of the infectious rabies virus) and then receded slowly over a period of 50 weeks. At the end of the test, 52 weeks after the immunization, the sera of the groups of dogs had the following values:

| Dog No. | Vaccination | Serum titer (50 % end point) 52 weeks after vaccination |
|---------|-------------|---------------------------------------------------------|
| 6053 6083 | 1 × 10 ml | 1 : 12.3 |
| 6190 6191 | 1 × 5 ml | 1 : 7.2 |

These dogs are immune against a lethal experimental infection with rabies virus (Amer. J. Vet. Res. 26, 24 – 30 (1965)).

In the above-described immunization test in dogs, a rabies vaccine of the state of the art obtained by inactivation with phenol according to Hempt was administered subcutaneously in a dose of 1 × 10 ml to a group of two dogs, at the same time as the vaccine of the present invention (serum titer at 50 percent end point 1 : 12.3). 14 Days after vaccination, serum titers of 1 : 12 were determined, at the end of the test (52 weeks after the vaccination) a serum titer (50 percent end point) of 1 : 3. This test, too, showed that the vaccine prepared according to the present invention had a better activity than the known vaccines.

Stability

The vaccine prepared according to the present Example was stored for 60 days at 56°C and compared with a rabies vaccine prepared by inactivation with phenol and stored at the lower temperature of 37°C.

The vaccine of the present invention exhibited no loss of activity after 60 days at 56°C whereas the vaccine prepared in known manner after 15 days at the lower temperature of 37°C already showed an activity of only $10^{1.6}$ PD 50 per 0.03 ml.

As is evident from the above, the vaccine prepared according to the present invention withstands higher temperatures considerably better whereas the vaccine used for comparison had already lost its antigenicity at a lower temperature.

EXAMPLE 2

A vaccine prepared as described in Example 1 from rabies viruses, which had been stabilized with Haemaccel, was subjected to the Habel test as well as to the stability test. The test results with indication of the test conditions are shown in the following Table. For comparison, two vaccines inactivated in known manner with phenol were used.

| Temperature | Duration of inactivation |
|---|---|
| 37°C | 60 days |
| 45°C | 35 days |
| 56°C | 7 days |

This Example shows that in the process of the present invention the inactivation time depends on the temperature.

All the samples were tested for innocuousness, activity and stability. The virus material was inactivated and active in the Habel test. After storage for 60 days at 56°C it showed no loss of activity.

EXAMPLE 4

Rabies virus were combined with Haemacell and inactivated by heating to 98°C, as indicated in Examples 1 and 2. The following Table shows the test results.

| Composition of the rabies vaccine | Method of inactivation Temperature | Time | Test for inactivity in a mouse i.c. injection | Result of the activity test in Habel test |
|---|---|---|---|---|
| 20 g of a rabbit's brain 40 ml of physiol. NaCl-solution 50 ml of sacch.-glutamate- solution 90 ml of Haemaccel | 98°C | 60 min. | no rabies virus found | 4.3 |

It has been shown in this Example that even extreme temperatures may be used for inactivation without impairing the activity of the vaccine of the present invention. The inactivation time is thereby essentially reduced.

EXAMPLE 5

Three vaccines, prepared in accordance with the present invention, i.e.

A 16 (inactivated for 5 days at +70°C)
A 17 (inactivated for 3 days at +70°C)
A 18 (inactivated for 7 days at +70°C),

| Composition of the vaccine and stabilizer solution | Method of inactivation | Result of activity test in the Habel test before exposure to temperature | after exposure to temperature |
|---|---|---|---|
| Rabies viruses in 20 g of a rabbit's brain 180 ml of Haemaccel | with phenol (for comparison) | 3.7 | 30 days 56°C = 1.2 |
| Rabies viruses in 20 g of a rabbit's brain 180 ml of Haemaccel | according to invention | 4.3 | 60 days 56°C = 3.8 |

The test results show that the vaccine containing rabies viruses inactivated according to the process of the present invention resist a considerably higher temperature than the vaccine prepared according to known processes.

EXAMPLE 3

Inactivation tests were carried out at various temperatures with samples of the material indicated in Example 1 and the following results were obtained:

were tested and compared in the Habel test with two rabies vaccines prepared by inactivation with phenol according to Hempt ($B_3$ and $B_4$).

As has already been explained in Example 1, the Habel test requires that 6 injections of 0.25 ml each of the vaccine, diluted to 0.5 percent of the nerve tissue proportion, protects against 1,000 $LD_{50}$ (log = 3) of the infectious virus. With the rabies vaccine according to Hempt, therefore, the 10 percent nerve tissue suspension is normally diluted in the ratio of 1 : 20.

| Vaccine Preparation | | Vaccine dilution % of nerve tissue proportion | | |
|---|---|---|---|---|
| | | 1:20(0.5 %) | 1:40 (0.25 %) | 1:80 (0.125 %) |
| A 16 according to the invention | a | 5.7 | 5.7 | 5.7 |
| | b | 1.0 | 1.4 | 2.0 |
| | c | 4.7 | 4.3 | 3.7 |
| A 17 according to the invention | a | 5.7 | 5.7 | 5.7 |
| | b | 1.4 | 2.4 | 2.1 |
| | c | 4.3 | 3.3 | 3.6 |
| A 18 according to the invention | a | 6.1 | 6.1 | 6.1 |
| | b | 1.0 | 1.0 | 1.6 |
| | c | 5.1 | 5.1 | 4.5 |
| B 3 according to state of the art | a | 5.3 | 5.3 | 5.3 |
| | b | 1.6 | 2.0 | 3.3 |
| | c | 3.7 | 3.3 | 2.0 |
| B 4 according to state of the art | a | 5.7 | 5.7 | not tested |
| | b | 2.6 | 3.6 | |
| | c | 3.1 | 2.1 | | a = log. of the 50 % end point of the control animals ($LD_{50}$)
b = log. of the 50 % end point of the vaccinated animals ($LD_{50}$)
c = log. of the $PD_{50}$ (a - b)

It can be seen from the above Table that the vaccines prepared according to the present invention in the dilutions 1 : 20, 1 : 40 and even 1 : 80 comply with the requirements of the Habel test. The rabies vaccines prepared according to Hempt corresponding to the state of the art, in a dilution of 1 : 20, comply with the requirements of the Habel test and in the dilution of 1 : 40, only one vaccine passed the test, and in the dilution of 1 : 80 this vaccine no longer complied with the requirements of the Habel test. Thus, the vaccines of the present invention have a far better antigenicity than the vaccines prepared according to the state of the art.

We claim:

1. Method for inactivating a pathogenic rabies virus which process comprises freeze drying said rabies virus in the presence of a gelatin hydrolyzate containing cross linking urea-alkylene-urea groups and having a molecular weight from about 15,000 to 60,000 and then heating the freeze dried material at a temperature from 30°C to 110°C for 15 minutes to 12 weeks until the pathogenicity thereof is completely destroyed.

2. A method as in claim 1 wherein said freeze-dried material is heated for one hour to ten weeks until the pathogenicity thereof is completely destroyed.

3. A method as in claim 1 wherein said freeze-dried material is heated to a temperature from 35°C. to 100°C until the pathogenicity thereof is completely destroyed.

* * * * *